US012106283B2

United States Patent
Yang et al.

(10) Patent No.: US 12,106,283 B2
(45) Date of Patent: *Oct. 1, 2024

(54) CONTACTLESS ATM TRANSACTIONS

(71) Applicant: Wells Fargo Bank, N.A., San Francisco, CA (US)

(72) Inventors: Young M. Yang, San Francisco, CA (US); Kelly Q. Zeichick, San Francisco, CA (US)

(73) Assignee: Wells Fargo Bank, N.A., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/203,575

(22) Filed: May 30, 2023

(65) Prior Publication Data

US 2023/0297998 A1    Sep. 21, 2023

Related U.S. Application Data

(63) Continuation of application No. 17/676,447, filed on Feb. 21, 2022, now Pat. No. 11,699,145, which is a
(Continued)

(51) Int. Cl.
*G06Q 20/32* (2012.01)
*G06Q 20/10* (2012.01)
*G06Q 20/40* (2012.01)

(52) U.S. Cl.
CPC ..... *G06Q 20/3278* (2013.01); *G06Q 20/1085* (2013.01); *G06Q 20/40145* (2013.01)

(58) Field of Classification Search
None
See application file for complete search history.

(56) References Cited

U.S. PATENT DOCUMENTS

| 8,346,663 B2 | 1/2013 | Kawan |
| 9,098,846 B2 | 8/2015 | Gill et al. |

(Continued)

FOREIGN PATENT DOCUMENTS

| GB | 2 461 975 A | 1/2010 |
| KR | 20110032735 A | 3/2011 |

OTHER PUBLICATIONS

Osborn,"Tech of the Week #11: Contactless cash withdrawals using an ATM and NFC", https://www.comparethecloud.net/tech-of-the-week/11-contactless-cash-withdrawals-nfc/, 3 pages, Aug. 31, 2020.

(Continued)

*Primary Examiner* — Kristy A Haupt
(74) *Attorney, Agent, or Firm* — Foley & Lardner LLP

(57) ABSTRACT

Systems and methods for contactless transactions are described. A method includes transmitting, by a mobile device having a provider institution mobile application, a first data payload to a user-interactive device via a first short-range wireless communication, and launching the provider institution mobile application on the mobile device based on the first short-range wireless communication. The method further includes transmitting authentication information to the user-interactive device via a second short-range wireless communication, receiving a request for transaction information from the user-interactive device via the second short-range wireless communication, and transmitting transaction information to the user-interactive device via a third short-range wireless communication as part of the transaction.

20 Claims, 6 Drawing Sheets

Related U.S. Application Data continuation of application No. 17/109,016, filed on Dec. 1, 2020, now Pat. No. 11,257,067.

(56) References Cited

U.S. PATENT DOCUMENTS

| | | | |
|---|---|---|---|
| 9,659,294 B2 | 5/2017 | Laracey | |
| 10,103,781 B2 | 10/2018 | Bellenger et al. | |
| 10,467,604 B1 | 11/2019 | Dorsch et al. | |
| 10,504,108 B2 | 12/2019 | Laracey | |
| 10,510,065 B2 | 12/2019 | Benkreira et al. | |
| 10,531,299 B1 | 1/2020 | Osborn et al. | |
| 10,535,047 B1 | 1/2020 | Thomas et al. | |
| 11,257,067 B1* | 2/2022 | Yang | G06Q 20/1085 |
| 11,699,145 B1* | 7/2023 | Yang | G06Q 20/1085 235/379 |
| 2011/0238573 A1* | 9/2011 | Varadarajan | G06Q 20/3263 705/43 |
| 2013/0238497 A1 | 9/2013 | Ramachandran et al. | |
| 2015/0058216 A1 | 2/2015 | Luciani | |
| 2016/0098700 A1 | 4/2016 | Johnson et al. | |
| 2017/0140144 A1* | 5/2017 | Bock | G06F 21/40 |
| 2017/0243184 A1 | 8/2017 | Bondesen et al. | |
| 2018/0165663 A1* | 6/2018 | Naik | G06Q 20/3223 |
| 2019/0347643 A1 | 11/2019 | Skelsey et al. | |
| 2021/0150497 A1 | 5/2021 | Phillips et al. | |

OTHER PUBLICATIONS

"Use your phone instead of a card at the ATM"; CNET News; May 25, 2016; https://www.youtube.com/watch?v=5pkm_SYkcbI, 3 pages.

Osborn, "Tech of the Week #11: Contactless cash withdrawals using an ATM and NFC", https://www.comparethecloud.net/tech-of-the-week/11-contactless-cash-withdrawals-nfc/, 3 pages.

US Payments Forum, "Guidelines for Contactless ATM Transactions—A Guide for ATM Owners and Operators", Jul. 2019, 30 pages.

\* cited by examiner

CONTACTLESS ATM TRANSACTIONS

CROSS REFERENCE TO RELATED PATENT APPLICATIONS

This application is a continuation of U.S. patent application Ser. No. 17/676,447, entitled "CONTACTLESS ATM TRANSACTIONS, filed Feb. 21, 2022, which is a continuation of U.S. patent application Ser. No. 17/109,016, entitled "CONTACTLESS ATM TRANSACTIONS," filed Dec. 1, 2020, which is incorporated herein by reference in its entirety.

TECHNICAL FIELD

The present application relates to touchless or contactless transactions at an automated teller machine ("ATM").

BACKGROUND

ATMs are widely used throughout the world to offer financial services in convenient locations. ATMs provide a variety of financial services without the assistance of a human teller. For example, available financial services may include depositing, withdrawing, or transferring funds, exchanging currency, selecting and viewing account balances, managing accounts and profiles, and so on. Traditionally, users desiring to complete a transaction must physically touch an ATM that may have been touched by countless other users. This requisite for physical touch presents a myriad of issues, for both the user and the device. It would be desirable to provide a touchless transaction process.

SUMMARY

One embodiment relates to a method for conducting an ATM transaction via a mobile device. The method includes: transmitting, by a mobile device having a provider institution mobile application, a first data payload to the ATM via a first short-range wireless communication; receiving, by the provider institution mobile application, a request for authentication information regarding a user of the mobile device via the first short-range wireless communication; launching the provider institution mobile application on the mobile device based on the request for authentication information; receiving, by the provider institution mobile application, authentication information based on the request; transmitting, by the provider institution mobile application via the mobile device, the received authentication information to the ATM via a second short-range wireless communication; receiving, by the provider institution mobile application via the mobile device, a request for transaction information from the ATM via the second short-range wireless communication; and transmitting, by the provider institution mobile application via the mobile device, desired transaction information to the ATM as part of the ATM transaction.

Another embodiment relates to a mobile device. The mobile device includes a network circuit structured to exchange data with a provider institution computing system; an input/output device structured to exchange data with a user; a processor; and a memory configured to store program instructions of a provider institution mobile application that are executable by the processor to cause various operations. The operations include: receive a request to pre-stage a transaction from the user; receive an input designating a transaction type and a transaction configuration option; receive an indication of a first short-range communication between the mobile device and an automated teller machine (ATM) to initiate the pre-staged transaction; receive authentication information regarding the user based on receiving the indication of the first short-range communication; generate a data payload including the designated transaction type, the transaction configuration option, and the authentication information; transmit the data payload to the ATM via a second short-range communication between the mobile device and the ATM; and receive a confirmation indicating a completed pre-staged transaction based on the transmitted data payload.

Still another embodiment relates to a mobile device. The mobile device includes a network circuit structured to exchange data a provider institution computing system; an input/output device structured to exchange data with a user; a processor; and a memory configured to store program instructions of a provider institution mobile application that are executable by the processor to cause various operations. The operations include: transmit a first data payload to an automated teller machine (ATM) via a first short-range wireless communication; receive a request for authentication information regarding a user of the mobile device via the first short-range wireless communication; open the provider institution mobile application based on the request for authentication information; receiving authentication information via a graphical user interface of the opened provider institution mobile application based on the request; transmit the received authentication information to the ATM via a second short-range wireless communication; receive a request for transaction information from the ATM via the second short-range wireless communication; and transmit desired transaction information to the ATM as part of an ATM transaction.

These and other features, together with the organization and manner of operation thereof, will become apparent from the following detailed description when taken in conjunction with the accompanying drawings.

Figure 1:
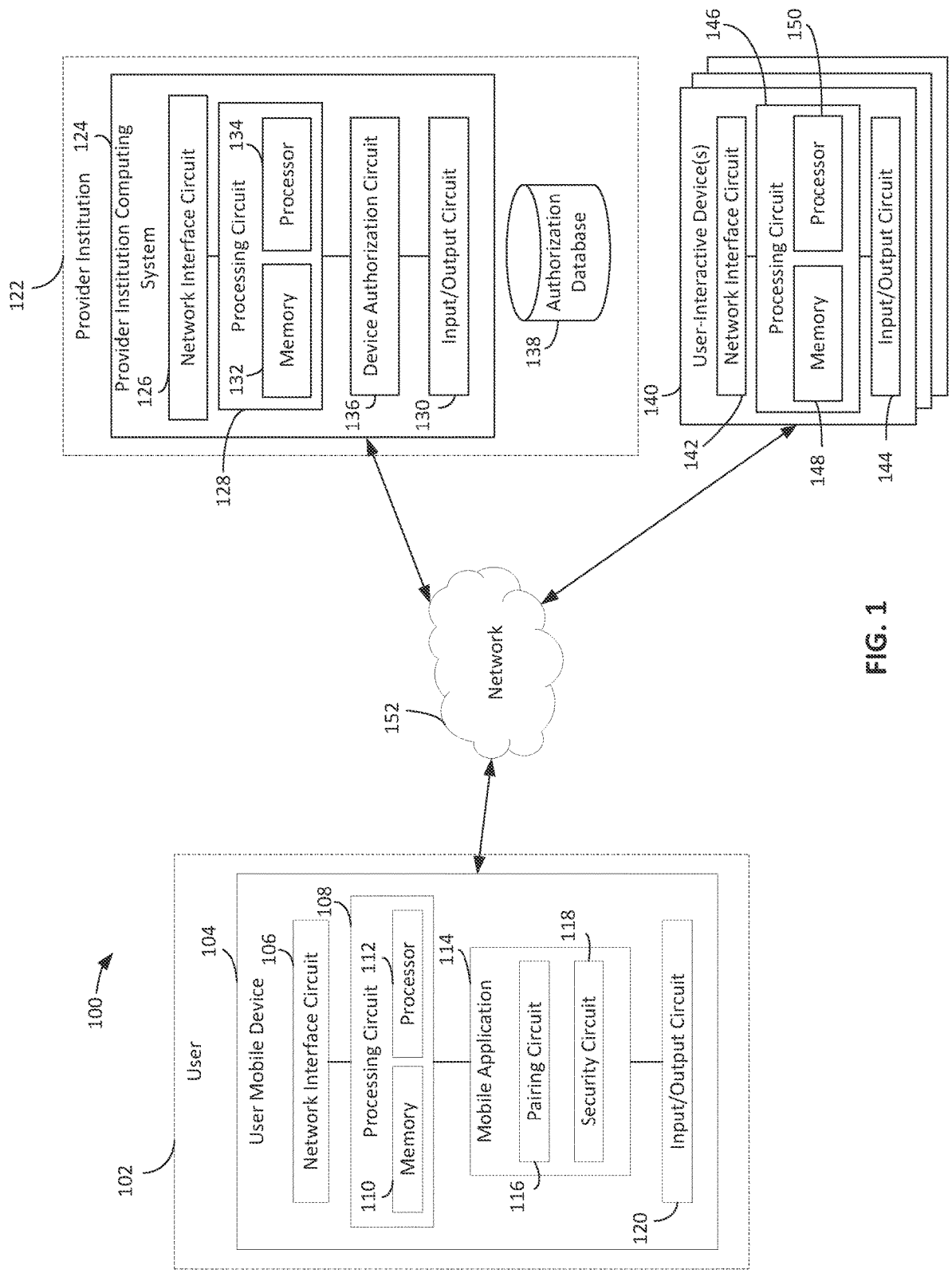
FIG. 1 is a schematic diagram of a touchless or contactless transaction computing system, according to an example embodiment.

It will be recognized that some or all of the figures are schematic representations for purposes of illustration. The figures are provided for the purpose of illustrating one or more embodiments with the explicit understanding that they will not be used to limit the scope or the meaning of the claims.

DETAILED DESCRIPTION

Referring generally to the Figures, systems and methods for conducting touchless, contactless, or substantially contactless transactions are shown and described herein. In particular, the innovations described herein relate to systems and methods for executing transactions, pre-staged or otherwise, through at least one "tap" of a mobile device against a user-interactive device (e.g., an ATM). The touchless transactions may be conducted via near field communication (NFC) taps of a mobile device against the user-interactive device. The "tap" is a near contact, likely non-contact event, between the mobile device and the ATM (user-interactive device) where the mobile device is positioned close enough to enable wireless communications, which for NFC, is typically less than five inches. The touchless transactions may be pre-staged or, in another embodiment, executed via multiple taps, with each sequential tap in the multiple tap implementation representing a discrete portion of the transaction.

Various improvements to ATM technology are described herein. Typically, a user conducting a transaction must physically touch the ATM. The ATM has often been touched by countless other users and may cause a current user to become concerned about health-related issues (e.g., viral transmission from a keyboard/interface). Additionally, such devices are prone to intrusion or spying. For example, a user entering their personal identification number (PIN) at the ATM is vulnerable to both malicious intrusion and viral contamination. A malicious actor may also attempt to skim card details. Accordingly, an improved method for conducting such transactions is desired.

The innovations described herein alleviate the aforementioned issues. Through the systems and methods provided, a user is able to conduct a touchless or contactless transaction using a mobile application running on a mobile device. The user is able to reduce the health concerns of traditional transactions, as the user is not required to touch the ATM unless the user is grabbing dispensed cash or a physical receipt. Furthermore, the risk of intrusion by malicious actors is significantly reduced. A transaction may be pre-staged at a safe or substantially safe location and subsequently completed via their mobile device. In this manner, time spent in front of the ATM is reduced, thereby reducing the time a user is vulnerable to malicious actors. Additionally, as no card need be inserted, nor PIN entered on the ATM, the only likely possibility of spying comes in the form of digital espionage. Further, the features described herein address such digital espionage: transmissions to and from the user mobile device may utilize encryption and tokenization technology.

It should be appreciated that while the innovations described herein are primarily described in relation to ATMs, various implementations may also be implemented with a plethora of other user-interactive devices. The user-interactive devices may be associated with a provider institution or a third-party. In this regard, the user-interactive devices may include a card reader at a branch location of a provider institution, a point-of-sale system at a merchant, or another user-interactive device used to complete a transaction. The user-interactive devices may include short wireless range technology (e.g., a NFC chip) that enable the systems and processes described herein to be performed with these devices.

Referring now to FIG. 1, a schematic diagram of a touchless transaction computing system 100 is shown, according to an example embodiment. The touchless transaction computing system 100 includes a user mobile device 104, a provider institution computing system 124, and one or more user-interactive devices 140. The user mobile device 104, the provider institution computing system 124, and the one or more user-interactive devices 140 are each communicably coupled and configured to exchange information over a network 152, which may include one or more of the Internet, cellular network, Wi-Fi, Wi-Max, a proprietary banking network, a proprietary retail or service provider network, or any other type of wired or wireless network.

The user mobile device 104 may be a mobile computing device associated with a user 102 (e.g., owned by, used by, etc.). The user mobile device 104 may include a mobile phone, a tablet, a laptop, a wearable device, a virtual/augmented reality (VR/AR) device, and/or other suitable mobile user computing devices capable of accessing and communicating using local and/or global networks (e.g., the network 152). Wearable computing devices refer to types of devices that an individual wears, including, but not limited to, a watch (e.g., a smart watch), glasses (e.g., eye glasses, sunglasses, smart glasses, etc.), bracelet (e.g., a smart bracelet), etc.

The user 102 may be a customer or client of the provider institution associated with the provider institution computing system 124 (e.g., an account holder). Accordingly, the user 102 may be an individual, a representative(s) of a small or large business entity, and any other individual authorized to use the mobile application 114.

The mobile device 104 is shown to include a network interface circuit 106, a processing circuit 108, a mobile application 114, and an input/output circuit 120. The network interface circuit 106 is structured to establish connections with other computing systems and user-interactive devices (e.g., the provider institution computing system 122 and the one or more user-interactive devices 140) by way of the network 152. Accordingly, the network interface circuit 106 enables the user mobile device 104 to transmit and/or receive information to and/or from the provider institution computing system 122 and the one or more user-interactive devices 140. The network interface circuit 106 includes program logic that facilitates connection of the user mobile device 104 to the network 152. For example, the network interface circuit 106 may include a combination of a wireless network transceivers (e.g., a cellular modem, a NFC transceiver, a Bluetooth transceiver, a Wi-Fi transceiver, etc.) and/or a wired network transceivers (e.g., an Ethernet transceiver). In some arrangements, the network interface circuit 106 includes the hardware and machine-readable media sufficient to support communication over multiple channels of data communication. Further, in some arrangements, the network interface circuit 106 includes cryptography capabilities to establish a secure or relatively secure communication session in which data communicated over the session is encrypted.

The processing circuit 108 includes a memory 110 and a processor 112. The memory 110 may be one or more devices (e.g., RAM, ROM, Flash memory, hard disk storage) for storing data and/or computer code for completing and/or facilitating the various processes described herein. Memory 110 may be or include non-transient volatile memory, non-volatile memory, and non-transitory computer storage media. Memory 110 may include database components, object code components, script components, or another type of information structure for supporting the various activities and information structures described herein. The memory 110 may be communicably coupled to the processor 112 and include computer code or instructions for executing one or more processes described herein. The processor 112 may be implemented as one or more application specific integrated circuits (ASICs), field programmable gate arrays (FPGAs), a group of processing components, or other suitable electronic processing components. As such, the user mobile device 104 is configured to run a variety of application programs and store associated data in a database of the memory 110. One such application may be the provider institution 122 mobile application 114.

The mobile device includes a mobile application 114 (also referred to herein as client application 114, mobile client application 114, and/or provider institution client application 114) that is provided by and coupled to the provider institution computing system 124. The mobile application includes a pairing circuit 116 and a security circuit 118. In some arrangements, the mobile application 114 may be a standalone application or be incorporated with an existing application of the user mobile device 104 (e.g., integrated into a mobile banking application, a service provider application, etc.). The mobile application 114 may be downloaded by the user mobile device 104 prior to its usage, hard coded into the memory 110 of the user mobile device 104, or be a network-based or web-based interface application such that the provider institution computing system 124 may provide a web browser to access the application, which may be executed remotely from the user mobile device 104. In the latter instance, the user (e.g., the user 102) may have to log onto or access the web-based interface before usage of the application. In the example shown, the mobile application 114 is downloaded to the user device and provided by the provider institution computing system via, for example, an app store for download. In the example shown, the mobile application 114 is structured as a mobile banking application. The mobile banking application 114 may be developed and maintained (e.g., provided with software updates on a regular or semi-regular basis) by the provider institution 122 using the provider institution computing system 124. Accordingly, the user mobile device 104 may include software and/or hardware capable of implementing a network-based or web-based application. For example, in some instances, the mobile application 114 includes software such as HTML, XML, WML, SGML, PHP (Hypertext Preprocessor), CGI, and like languages.

Accordingly, the mobile application 114 may be at least partially supported by a separate computing system (e.g., the provider institution computing system 124) including one or more servers, processors, network interface circuits, etc. that transmit applications for use to the user mobile device 104. Furthermore, prior to use of the mobile application 114 and/or at various points throughout the use of the mobile application 114, the user (e.g., the user 102) may be required to provide various authentication information (e.g., a password, a pass code, a personal identification number (PIN), a fingerprint scan, a retinal scan, a voice sample, a face scan, any other type of biometric security scan) to ensure that the user 102 associated with the user mobile device 104 is authorized to use the mobile application 114.

The mobile application 114 is structured to generate and provide displays (e.g., graphical user interfaces) via a display device of user mobile device 104. For example, the displays may provide information pertaining to accounts held at the provider institution 122 and associated with the user 102. The information may include account balances, recent account activity, etc. Accordingly, the user 102 may manage their accounts at the provider institution 122 via the mobile application 114. As described herein, the mobile application 114 may generate graphical user interfaces (GUIs) for conducting contactless ATM transactions. The GUIs may include fields for pre-staging transactions, authentication information, providing information for a multiple-tap transaction process (e.g., as part of a discrete tap transaction process, as described in FIG. 3), and additional information described herein.

The mobile application 114 is configured to utilize the pairing circuit 116 in order to enable the user mobile device 104 to pair with a user-interactive device 140 (e.g., ATM). For example, the mobile application 114 may pair via the pairing circuit 116 with a point-of-sale system located at a merchant, and subsequently use the systems and methods described herein to complete a touchless transaction. In some instances, prior to allowing any transactions or other interactions to be performed, the mobile application 114 may be configured to confirm that the user mobile device 104 has been paired with the appropriate user-interactive electronic. For example, if there are several ATMs, each may be labeled with a number, and the mobile application 114 may request the user to confirm that they are at a particular ATM (e.g., ATM number 3). In the depicted embodiment, the pairing circuit 116 is included with the mobile application 114. In other embodiments, the pairing circuit 116 is separate from and coupled to the mobile application 114.

As mentioned above, the pairing circuit 116 is configured to initiate pairing with a user-interactive device 140. As described herein, and in one embodiment, the pairing is based on a tap of the user mobile device 104 with the user-interactive device 140 (e.g., an ATM). Once paired with a user-interactive device 140, data may be exchanged with the user-interactive device 140 as part of a touchless transaction. For example, the pairing circuit 116 may utilize an NFC protocol to initiate the pairing and to communicate (e.g., transmit and receive) data payloads with an ATM. The pairing circuit 116 may be configured to provide encryption functionalities (e.g., the pairing circuit 116 may encrypt and/or tokenize data payloads associated with paired device). For example, the pairing circuit 116 may encrypt and/or tokenize certain aspects, or all, of the data payload prior to a transmission of the data payload. The pairing circuit 116 is configured to utilize a variety of technologies and/or communication protocols (e.g., Bluetooth, Wi-Fi, NFC, etc.). In one embodiment, the communication protocols are included with the mobile device (e.g., a separate NFC chip) and the pairing circuit communicates and controls these devices. In another embodiment, the pairing circuit 116 includes dedicated one or more communication chips thereby allowing relatively more secure communication means (e.g., includes a Bluetooth transceiver and/or NFC chip).

As mentioned above, in one embodiment, the pairing circuit 116 is structured to pair the mobile device 104 with the user interactive device 140 based on a NFC communication between the mobile device 104 and the device 140. In another embodiment, a different communication protocol may be utilized, such as Bluetooth or Wi-Fi. Beneficially, the use of NFC implicates a close physical relationship between the mobile device 104 and the device 140, which may promote security in the touchless transaction. Once "paired," the mobile device 104 and device 140 may communicate to enable a touchless transaction. As described herein and in one embodiment, the pairing and transaction occurs via a single tap (e.g., the pre-staged transaction embodiment). In another embodiment, multiple taps occur as part of the transaction. In either situation, the security circuit 118 may employ one or more additional security checks or protocols to impart security to this transaction.

The mobile application 114 may generate and transmit data payloads to the user-interactive device 140 (e.g., ATM 140). The data payloads refer to the data packet that is sent in a transmission to the ATM 140. The data payload may include a payment token that is associated with a payment account of the user 102 (e.g., a checking account provided by the provider institution 122). The payment token may replace the account number for the payment account with a tokenized primary account number. The provider institution computing system 124 may have a token vault that maps the payment token to the account number as part of a transaction. Beneficially, the use of a payment token alleviates transmission of account information and, namely, a primary account number. The data payloads may also include additional information including, but not limited to, user information (e.g., name or another identifier), information regarding a selected account for the transaction (each of which may be associated with a payment token), a PIN or other authentication information, and so on.

The data payloads or parts thereof (e.g., the payment token) may be tokenized by the pairing circuit 116 in order to prevent skimming and/or other methods of identifying secure information of the user. In some instances, the tokenized data payload may include information regarding an authorized pre-staged transaction held, which may be stored or held in an authorization database 138 of the provider institution computing system 124. In such an instance, the mobile application 114 transmits the tokenized data payload that is mapped by the provider institution computing system 140 to complete the transaction. In other instances, the transaction may not be pre-staged and as such, utilize multiple physical taps in order to relay pertinent information associated with the transaction. In the aforementioned instance, the secure and or personally identifying information of the user 102 may be tokenized.

In other embodiments, the data payloads or parts thereof may be encrypted (e.g., by the security circuit 118). In one embodiment, a decryption key is transmitted as part of the encrypted payload to the ATM 140. The ATM 140 utilizes the decryption key to decrypt the payload and identify the transmitted information (e.g., payment token or account number if not tokenized, user information, transaction details, and so on). In another embodiment, the decryption key may be stored by the provider institution computing system 124. In this situation, the provider institution computing system 124 may transmit the decryption key to ATM 140 that is the subject of the touchless transaction. Or, the ATM 140 may transmit the encrypted data payload to the provider institution computing system 124 that utilizes the decryption key to decrypt the data payload.

Still referring to FIG. 1, the security circuit 118 is included with the mobile application 114. In other embodiments, the security circuit 118 is separate from the mobile application 114, and coupled to the mobile application 114. The security circuit 118 is structured to determine the identity of a user of the user mobile device 104. The security circuit 118 may include or be coupled to a variety of hardware or software which capture and analyze attributes of a user (e.g., a face scan, a voice scan, a retinal scan, a fingerprint scan, etc.).

The security circuit 118 may be structured or configured to impart security into the transaction by ensuring that the transaction only occurs with a designated user interactive device 140. This may be in addition to verifying the user, as mentioned above. For example, in one embodiment, the user may choose an ATM 140 via the mobile client application 114 (or, an ATM 140 may be suggested/recommend based on the location of the user mobile device and the capabilities desired for the transaction). The security circuit 118, via the mobile device, may transmit this selection or accepted recommendation to the provider institution computing system 124 and/or the selected/recommended ATM 140. Accordingly, the provider institution computing system 124 may only allow transactions at the selected/recommended ATM. For example, a user 102 may pre-stage a transaction at their home via the mobile application 114 and subsequently receive an authorization from the provider institution computing system 124 for the pre-staged transaction at a particular ATM (e.g., a recommended or selected ATM).

Accordingly, the pre-staged transaction may only be authorized at that particular ATM. In this regard, after transmitting the pre-staged transaction information, the provider institution computing system 124 may provide an authorization approval along with an ATM identifier (e.g., a unique numeric or alphanumeric value specific to an ATM). The ATM identifier may be dynamically generated by the provider institution computing system 124. For example, when a pre-staged transaction is initiated and authorized, matching ATM identifiers are provided to the mobile application and the selected/recommended ATM by the computing system 124. When the transaction is initiated at the ATM, the mobile application 114 receives an ATM identifier to confirm a match. Alternatively, the ATM identifiers may be static (i.e., specific to each ATM and largely unchanging). In either situation, when the user attempts to complete a pre-staged transaction at an ATM, the mobile application 114 may receive an ATM identifier specific to that particular ATM. The mobile application 114 then compares the received ATM identifier to the ATM identifier from the provider computing system 124. If they do not match, the mobile application 114 may prevent the transaction. If they do match, the mobile application 114 may take no action and allow the pre-staged transaction to proceed. Alternatively, if they do not match, step-authentication may be performed to confirm whether the user wants to proceed at this particular ATM (e.g., a subsequent passcode needs to be received, etc.).

As another example, the security circuit 118 may receive location information of the mobile device 104 and only allow touchless transactions in a geo-fenced area surrounding the location of the mobile device (e.g., ten mile radius) (or, in a designated area that is designated via the mobile application 114). In this regard, the security circuit 118 may be linked, either tangibly via hardware, or indirectly via software, with a global positioning system (GPS) of the user mobile device 104. The security circuit 118 may utilize the GPS data to assess position of the mobile device, which may be used to confirm/deny the transaction at the ATM. In another example and as alluded to above, the authorization may be limited to a predetermined geographical radius encompassing the originating point of the pre-staged transaction (e.g., the home of the user 102 (if known) or the location of the mobile device). Accordingly, as the user 102 attempts to execute the pre-staged transaction, the security circuit 118 may determine if the user 102 is an authorized user of the user mobile application 114 (e.g., through biometric analysis of the user in possession of the user mobile device 104) and also if the transaction is being executed within the allowed predetermined geographical radius.

As still another example, after pairing, the security circuit 118 may only permit communications with a paired device. In this regard, after the first tap, the security circuit 118 may restrict the initiated transaction from occurring with any other ATM. Alternatively, the user may via the mobile application 114 provide an explicit command to stop or suspend the transaction and instruct that the touchless transaction is approved for continuance at another different ATM (user interactive device).

The input/output circuit 120 is structured to receive communications from and provide communications to the user 102. In this regard, the input/output circuit 120 is structured to exchange data, communications, instructions, etc. with an input/output component of the user mobile device 104. In one embodiment, the input/output circuit 120 includes an input/output device. In another embodiment, the input/output circuit 120 includes communication circuitry for facilitating the exchange of data, values, messages, and the like between an input/output device and the components of the user mobile device 104. In yet another embodiment, the input/output circuit 120 includes machine-readable media for facilitating the exchange of information between an input/output device and the components of the user mobile device 104. In still another embodiment, the input/output circuit 120 includes a combination of hardware components, communication circuitry, and machine-readable media. For example, in some embodiments, the input/output circuit 120 may include suitable input/output ports and/or an interconnect bus (not shown) for interconnection with a local display (e.g., a touchscreen display) and/or keyboard/mouse devices (when applicable), or the like, serving as a local user interface for programming and/or data entry, retrieval, or manipulation purposes. That is, the input/output circuit 120 provides an interface for the user 102 to interact with various applications (e.g., the mobile application 114) stored on the user mobile device 104.

Still referring to FIG. 1, the provider institution computing system 124 is associated with (e.g., owned, managed, and/or operated by) the provider institution 122. In the example depicted, the provider institution 122 is a financial institution capable of providing one or more financial products and services (e.g., banking (e.g., the providing of various accounts, such as a demand deposit account), lending, money transfers, issuing credit and/or debit cards, wealth management, etc.). Thus, the associated provider institution computing system 124 is structured to provide or otherwise facilitate providing the one or more financial products and services to customers. As such, the provider institution may also be referred to as a financial institution herein that provides banking services to customers. For example, customers can deposit funds into accounts, withdraw funds from accounts, transfer funds between accounts, view account balances, and the like via the provider institution computing system 124. As described herein, the provider institution computing system 124 is structured to support at least some of the functions and services described below. As depicted, the provider institution computing system 124 is a backend computer system. The provider institution computing system 124 may be implemented using a computing system, such as a discrete server, a group of two or more computing devices/servers, a distributed computing network, a cloud computing network, and/or another type of computing system capable of accessing and communicating using local and/or global networks (e.g., the network 152).

The provider institution computing system 124 includes a network interface circuit 126, a processing circuit 128, a device authorization circuit 136, and an input/output circuit 130. The provider institution computing system 124 includes an authorization database 138. In an alternate embodiment, the authorization database 138 may be a part of another computing system, accessed as needed by the provider institution computing system 124.

The network interface circuit 126 is structured to establish communicable connections with other computing systems (e.g., the user mobile device 104, a user-interactive device 140, other computing systems, etc.), by way of the network 152. The network interface circuit 126 may include program logic that facilitates connection of the provider institution computing system 124 to the network 152. For example, the network interface circuit 126 may include a combination of a wireless network transceivers (e.g., a NFC transceiver, a Bluetooth transceiver, a Wi-Fi transceiver, etc.) and/or a wired network transceiver (e.g., an Ethernet transceiver). In some arrangements, the network interface circuit 126 includes the hardware and machine-readable media sufficient to support communication over multiple channels of data communication. Further, in some arrangements, the network interface circuit 126 includes cryptography capabilities to establish a secure or relatively secure communication session in which data communicated over the session is encrypted.

The processing circuit 128 includes a memory 132 and a processor 134. The memory 132 may be one or more devices (e.g., RAM, ROM, Flash memory, hard disk storage) for storing data and/or computer code for completing and/or facilitating the various processes described herein. Memory 132 may be or include non-transient volatile memory, non-volatile memory, and non-transitory computer storage media. Memory 132 may include database components, object code components, script components, or other types of information structured for supporting the various activities and information structures described herein. The memory 132 may be coupled to the processor 134 and include computer code or instructions for executing one or more processes described herein. The processor 134 may be implemented as one or more server processors, application specific integrated circuits (ASIC), field programmable gate arrays (FPGAs), digital signal processor (DSP), microprocessors, or other suitable electronic processing components. The server(s) or server computer may be geographically dispersed relative to other server(s) of the provider institution computing system 124. Further, there may be a variety of different types of server(s) included in the computing system 124 (e.g., application server, database server, catalog sever, communications server, web server, and so on). The memory device may be included with the server(s). The provider institution computing system 124 is configured to run a variety of application programs and store associated data in a database of the memory 132.

The provider institution computing system 124 further includes a device authorization circuit 136. The device authorization circuit 136 is structured to retrieve information from the authorization database 138 and determine user and user mobile device information, such as user account credentials (e.g., a username, a password, a PIN, biometric markers, etc.), user demographics, mobile device identifiers (e.g., a unique value tied to the hardware of the device such as a MAC), and mobile device authorizations (e.g., a mobile device authorized for a pre-staged transaction and identified by the mobile device identifier). The device authorization circuit 136 may also retrieve information from the authorization database 138 and determine transaction information, such as a transaction type (e.g., a withdrawal, a deposit, a balance inquiry, etc.), a transaction amount (e.g., in a currency), an origination point for pre-staged transactions (e.g., the mobile application 114 determines a current location of the user subsequent to pre-staging a transaction and transmits it to the provider institution computing system 124), an allowable radius from the origination point for executing a pre-staged transaction (e.g., the user 102 pre-stages a transaction from a location X and configures the pre-staged transaction to be executable within 5 miles from location X), a specific authorized user-interactive device for a pre-staged transaction (e.g., the user 102 pre-stages a transaction that may only be completed at ATM #34 at location Y), and an expiration parameter (e.g., a time and date that the pre-staged transaction must be completed by). For example, an authorized pre-staged transaction must occur in a predefined time period or the authorization expires. The device authorization circuit 136 is further structured to determine if a user mobile device 104 is authorized for a transaction, pre-staged or otherwise (e.g., as discussed herein with respect to FIGS. 2, 3, 4, and 5.)

Figure 3:
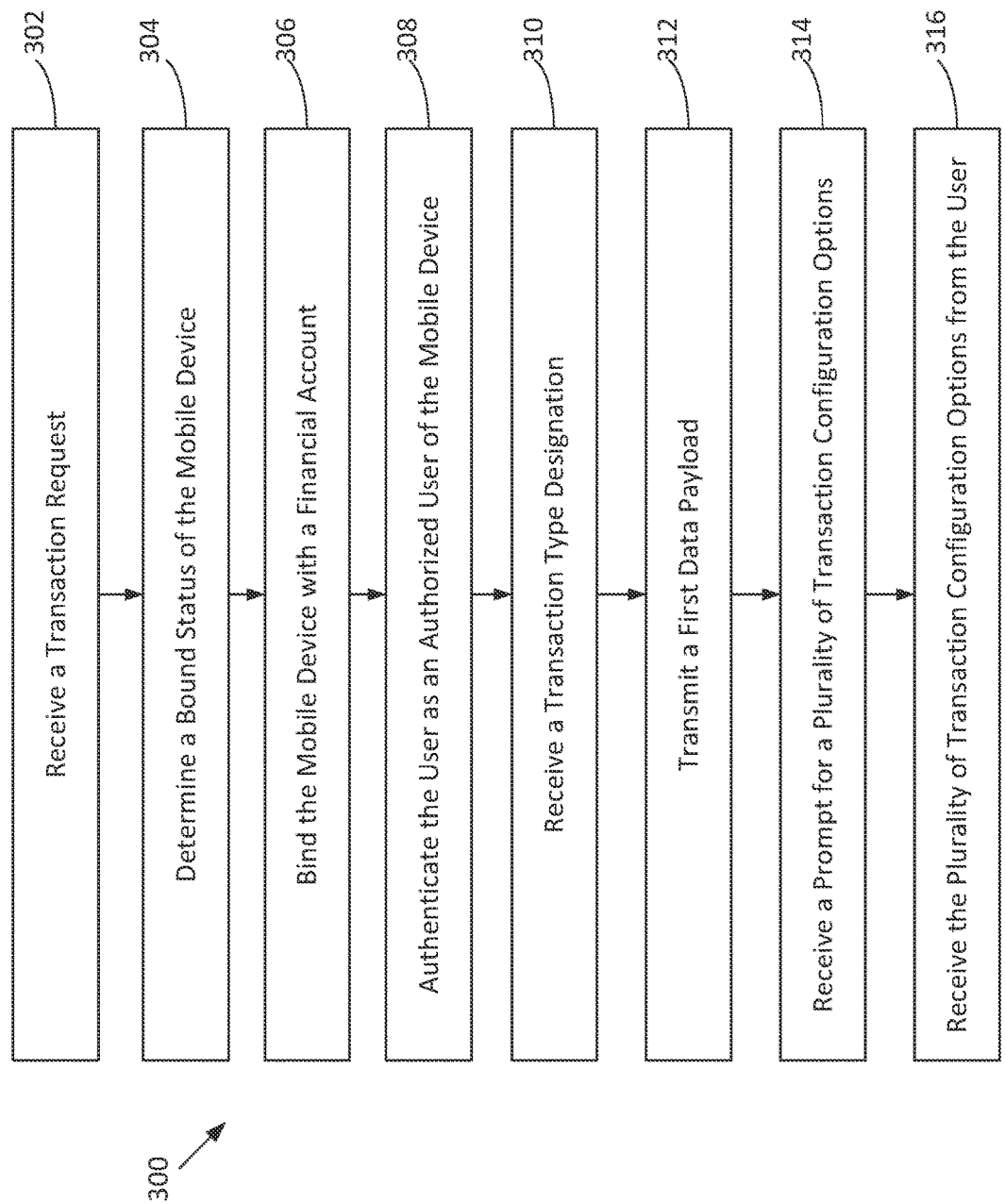
FIG. 3 is a flow diagram of a method for conducting a touchless transaction at an ATM, according to an example embodiment.
Figure 4:
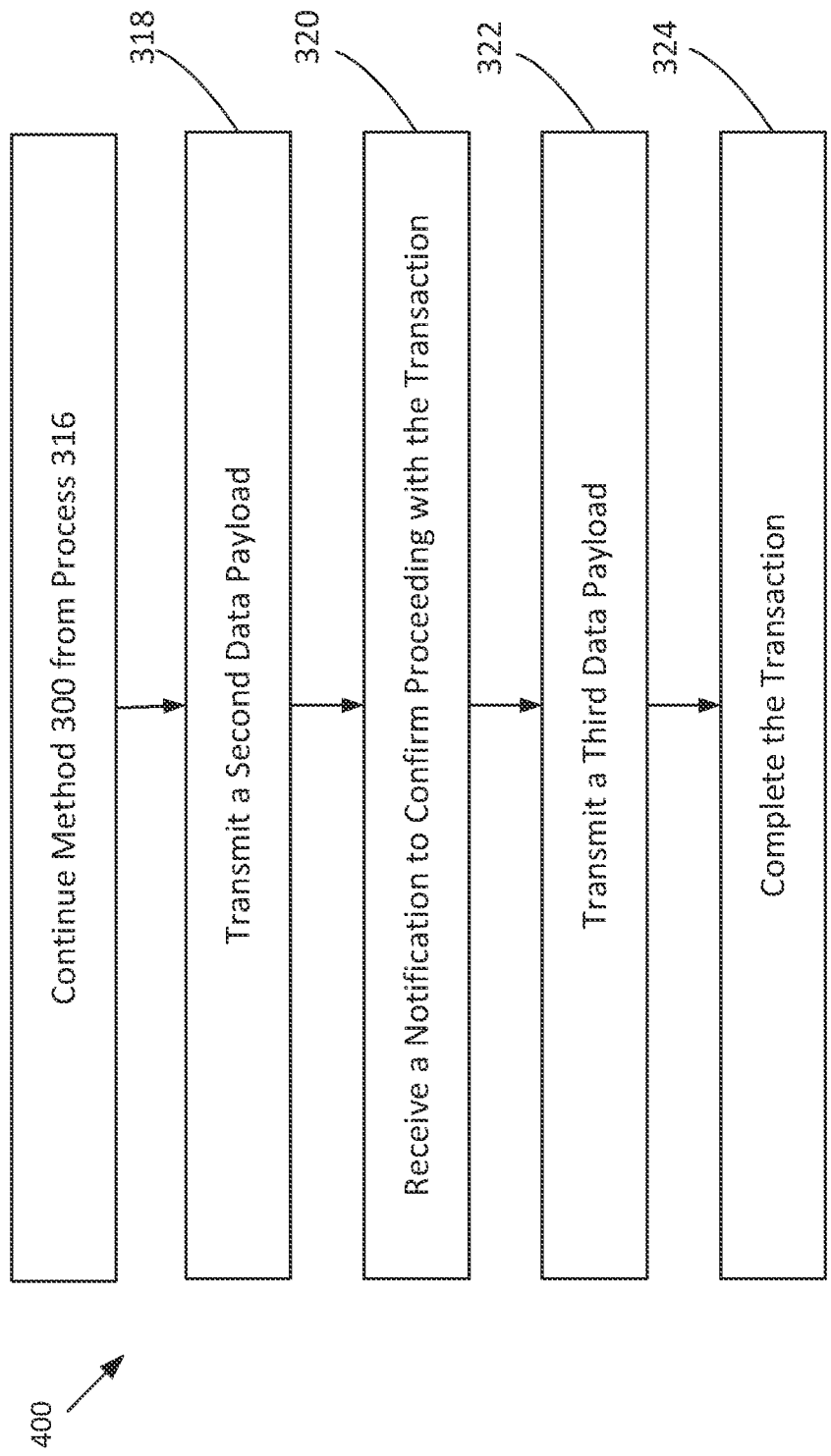
FIG. 4 is a flow diagram continuing the method from FIG. 3 for conducting a touchless transaction, according to the example embodiment.

The authorization database 138 is configured to hold, store, categorize, and/or otherwise serve as a repository for information pertaining to users, user devices (including a bound status of the user mobile device 104, as discussed herein with reference to FIGS. 3 and 4), and transaction information associated with, for example, pre-staged transactions (e.g., as discussed above). Accordingly, the device authorization circuit 136 is configured to selectively access the authorization database 138 to retrieve information pertaining to a particular user 102 and user mobile device 104.

The input/output circuit 130 of the provider institution computing system 124 is structured to exchange data, communications, instructions, etc. with an input/output component of the provider institution computing system 124 (e.g., a keyboard, a mouse, etc.) (e.g., with a provider institution employee, non-employee, operator, etc.). In one embodiment, the input/output circuit 130 is incorporated into an input/output device. For example, a laptop, desktop, or tablet computer may include the input/output circuit 130 such that the laptop, desktop, or tablet computer is communicably coupled to the provider institution computing system 124. The input/output circuit 130 is structured to receive communications from, and provide communications to, various provider institution 122 employees, agents, or operators associated with the provider institution computing system 124.

The one or more user-interactive devices 140 may include ATMs, card readers at a branch location of a provider institution 122, a third-party point of sale system, and other user-interactive terminal associated with the provider institution 122 (e.g., electronic device structured to facilitate financial operations via the mobile application 114). In the example shown, the user interactive device is an ATM. Accordingly, the user interactive device 140 may be referred to as an ATM 140 herein. The ATM 140 may enable operations including, for example, cash withdrawals, deposits, fund transfers, transactions, and account inquiries. For clarity purposes, the following description will be in reference to a single user-interactive device 140. However, it should be understood that any number of user-interactive devices 140 may be utilized within the touchless transaction computing system 100. Accordingly, the following description may be applied to each user-interactive device 140 utilized within the touchless transaction computing system 100. Furthermore, in the example shown, the ATM 140 are network-enabled user-interactive devices. In some other embodiments, the ATM 140 may not contain a network interface circuit 142 and may not be network-enabled (e.g., the user-interactive device 140 may include short-range protocol enabled only, such as NFC, Bluetooth, etc.). Being networked, the ATM 140 may communicate over the network with the provider institution computing system 124 and/or user mobile device 104.

The user-interactive device or ATM 140 includes a network interface circuit 142, a processing circuit 146, and an input/output circuit 144. The network interface circuit 142 is structured to establish connections with other computing systems (e.g., the user mobile device 104, the provider institution computing system 124, etc.) via the network 152. The network interface circuit 142 may include program logic that facilitates connection of the ATM 140 to the network 152. For example, the network interface circuit 142 may include a combination of wireless network transceivers (e.g., a Wi-Fi transceiver, etc.) and/or wired network transceivers (e.g., an Ethernet transceiver). In some arrangements, the network interface circuit 142 includes the hardware and machine-readable media sufficient to support communication over multiple channels of data communication. Further, in some arrangements, the network interface circuit 142 includes cryptography capabilities to establish a secure or relatively secure communication session in which data communicated over the session is encrypted. The network interface circuit 142 also includes short-range wireless communication components, such as a NFC chip and a Bluetooth transceiver. The short-range wireless communication of the ATM enables the pairing and touchless transactions described herein.

The processing circuit 146 includes a memory 148 coupled to a processor 150. The memory 148 may be one or more devices (e.g., RAM, ROM, Flash memory, hard disk storage) for storing data and/or computer code for completing and/or facilitating the various processes described herein. Memory 148 may be or include non-transient volatile memory, non-volatile memory, and non-transitory computer storage media. Memory 148 may include database components, object code components, script components, or other types of information structured for supporting the various activities and information structures described herein. The memory 148 may be coupled to the processor 150 and include computer code or instructions for executing one or more processes described herein. The processor 150 may be implemented as one or more processors, application specific integrated circuits (ASICs), field programmable gate arrays (FPGAs), a group of processing components, or other suitable electronic processing components. As such, the user-interactive device 140 is configured to run a variety of application programs and store associated data in a database of the memory 148. One such application may be an application provided by the provider institution 122 for authenticating and facilitating financial operations, as discussed above.

The input/output circuit 144 of the user-interactive device 140 is structured to receive input and provide output to a variety of users (e.g., the user 102, a maintenance person, an employee of the provider institution 122, a merchant, etc.). In one embodiment, the input/output circuit 144 includes an input/output device (e.g., a touchscreen, a keyboard, card reader, etc.). In another embodiment, the input/output circuit 144 includes communication circuitry for facilitating the exchange of data, values, messages, and the like between an input/output device of the ATM and a user of the ATM.

Figure 2:
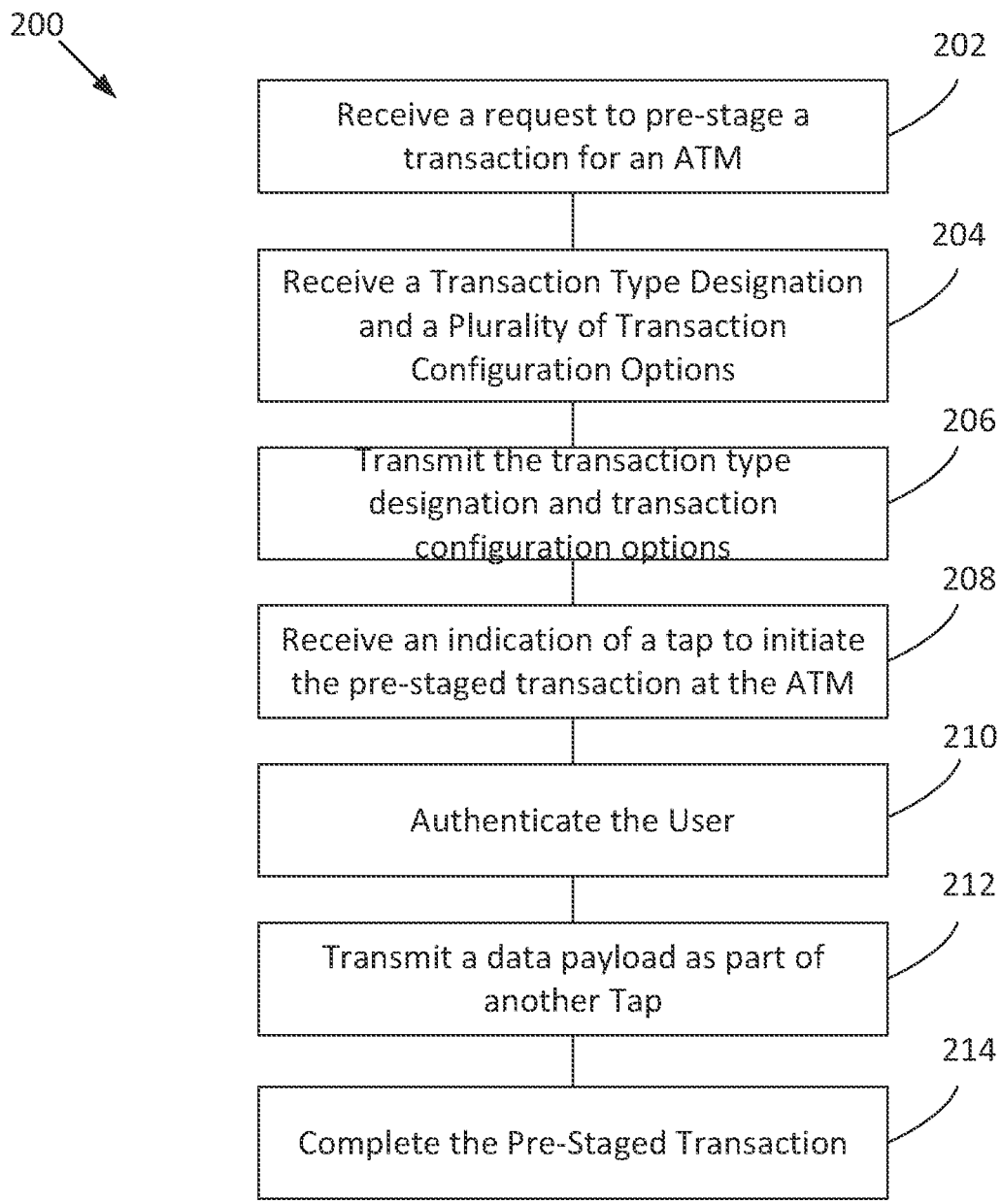
FIG. 2 is a flow diagram of a method for conducting a pre-staged touchless transaction, according to an example embodiment.

Referring now to FIG. 2, a flow diagram for a method 200 for conducting a pre-staged, touchless transaction, is shown according to an example embodiment. Method 200 may be performed using the system of FIG. 1 such that reference is to the components of FIG. 1 to aid the description of method 200. The method 200 is applicable with the user-interactive device 140 being an ATM and, as such, is discussed herein as so.

The method 200 begins at process 202 with receiving, by the mobile application 114, a request to pre-stage an ATM transaction. As a predecessor to receiving the request to pre-stage the transaction, the user may be authenticated into the mobile application 114 (e.g., via the security circuit 118). Authentication information from the user 102 may be received which is used by the mobile application 114 to authenticate the user. The authentication information may include, for example, a PIN, a password, a biometric scan, etc. In one embodiment, the request may be initiated via the user 102 interacting with a button (e.g., icon, etc.) displayed on a graphical user interface (GUI) generated by the mobile application 114, or via another input modality provided by the mobile application 114 (e.g., a voice command, a command entered textually, etc.). In another embodiment, the request may be based on a short-range wireless communication with the ATM, which causes the mobile application 114 to launch (i.e., open). The short-range wireless communication may include the mobile application 114 receiving an ATM identifier, which may be used to confirm that the pre-staged transaction occurs at a designated/authorized ATM as described above.

At process 204, the mobile application 114 receives a designation of transaction type and transaction configuration options from the user 102. The designation of transaction type may be received from the user 102 via the input/output circuit 120 of the user mobile device 104. For example, the designation of transaction type may be received via a GUI display generated by the mobile application 114 that includes one or more fillable fields. The designation of transaction type indicates a desired transaction at the ATM 140. For example, the designation of transaction type may be a cash withdrawal, a deposit, a fund transfer, bill pay, etc.

The transaction configuration option(s) refer to the specifics/define the desired characteristics of the designated transaction type. For example, continuing the example of intended use at an ATM, the user 102 may define a designation of transaction type as a withdrawal and subsequently configure the transaction options to include an amount to withdraw, a preferred currency denomination for the withdrawal, and whether or not the user 102 desires a physical receipt of the transaction. In operation, the mobile application 114 may generate a graphical user interface showing a plurality of transaction designations (e.g., withdrawal, fund transfer, bill pay, etc.). Upon selecting one of the icons, the mobile application 114 may generate a subsequent GUI that enables an input of configuration options for the designated transaction (e.g., bill pay recipient and amount, to/from account for balance transfers, and so on).

At process 206, the mobile application 114 transmits to the provider institution computing system 124, over the network 152, details of the pre-staged transaction (e.g., the user mobile device 104 identifier, the designation of transaction type, and the transaction configuration options). The provider institution computing system 124 receives the details of the pre-staged transaction and generates authorization information representing the received details. The authorization information may then be retrievably stored in the authorization database 138 and used to verify the pre-staged transaction when the user 102 attempts to complete it. In this regard, if pre-staged transaction information that is received from the ATM 140 does not match the transmitted information from the mobile application 114, the transaction may be denied by the provider institution computing system 124.

At process 208, the mobile application 114 receives an indication of a tap of the user mobile device 104 relative to the ATM. The tap of the user mobile device 104 relative to the ATM causes the pairing circuit 116 to pair the mobile application 114 with the ATM (e.g., using a NFC protocol). The pairing may require preliminary negotiating communications between the devices (e.g., "handshakes") in order to successfully establish a communication layer (e.g., according to the communication protocol). In this regard, when NFC communication is engaged between the ATM and mobile device as described herein, there is a two-way communication of data that allows for a combined transmission and response in the communication (in other words, sending a data payload and receiving a response). The pairing may also include a sharing of device identifiers in order to ensure that each device is communicating with the intended recipient. In other examples that may utilize other wireless technologies, the indication may be responsive to the mobile application 114 determining that the user 102 is proximate (e.g., via Bluetooth, GPS, etc.) to the ATM.

At process 210, the mobile application 114 authenticates the user 102 as an authorized user of the user mobile device 104, via the security circuit 118. The authentication may include a variety of checks such as prompting the user for authentication credentials. In some embodiments, the authentication may be a step-up authentication process in order to authenticate in a more stringent manner than may be required to merely use the mobile application 114. The step-up authentication process may be a request for a second credential different than the first credential utilized in process 202 (e.g., the user 102 first entered a PIN and must now complete a facial scan). In some embodiments, the step-up authentication process may be a request for a credential specific to the account used for the touchless transaction (e.g., a PIN for a specific debit card that is the subject of a withdrawal—the pre-staged transaction is a withdrawal). For example, the additional authentication information may include one or more of the following: a PIN, a biometric scan (e.g., fingerprint analysis, facial feature analysis, voice analysis, etc.), a password, a two-factor notification (e.g., a confirmation link pushed or texted to the user mobile device 104), a one-time password, etc.

Subsequent to the successful authentication, the method continues at process 212 with a transmission of a data payload to the ATM, by the mobile application 114 and via the user mobile device 104. The data payload is transmitted as part of another tap of the user mobile device 104 relative to the ATM, and includes the designation of transaction type, the transaction configuration option(s), and the authentication information. The data payload may contain a payment token as described herein. The authentication information may then be verified or confirmed by the ATM and/or the provider institution computing system 124.

At process 214, the pre-staged transaction is executed and completed at the ATM. The mobile application 114 generates a GUI showing a confirmation of the transaction to the user. The mobile application 114 may receive a confirmation from the ATM 140 and/or provider institution computing system 124 indicating a successful completion of the pre-staged transaction. This indication may include transaction details, an updated real-time balance in their account, and other information. The mobile application 114 may then store this information so that the user may be able to see their previous transactions.

In some embodiments, the method 200 may be completed in a single tap of the user mobile device 104 relative to the ATM. For example, the authentication phase as described in process 210 may be completed as part of the pre-staging process (e.g., the user 102 enters all necessary credentials initially). Consequently, the first tap of the user mobile device 104 relative to the ATM may transmit a data payload containing the transaction information (e.g., transaction designation, configuration options, etc.) and the authentication information. In some embodiments, the ATM may then authenticate the authentication information of the data payload (e.g., via communication with the provider institution computing system 124, over the network 152). In other embodiments, the mobile application 114 may verify the authentication information with the provider institution computing system 124 and subsequently receive or generate an authentication approval value. The authentication approval value may be included in the data payload and may cause the ATM to bypass certain security measures (e.g., the ATM trusts the user 102 as previously authenticated due to the authentication approval value contained in the data payload). The authentication value may be generated and provided by the provider institution computing system responsive to the mobile application 114 authenticating the user. A shadow copy of this authentication value may also be stored by the provider institution computing system 124 and used to compare with the received authentication value. If there is a match (which may be based on other restrictions, such as time limits), then the transaction is approved.

Referring now to FIG. 3, a flow diagram for a method 300 for conducting a touchless transaction is shown according to an example embodiment. The method 300 begins at process 302 with the mobile application 114 receiving a request to initiate a transaction from the user 102. The request is based on the user 102 tapping a user mobile device 104 relative to a user-interactive device 140 (the ATM). The tap of the user mobile device 104 causes the pairing circuit 116 to pair with the ATM (e.g., using a NFC protocol).

At process 304, the mobile application 114 determines a bound status of the user mobile device 104. A user mobile device 104 may be considered bound if the user 102 previously associated the user mobile device 104 with a financial account associated with the provider institution (e.g., a demand deposit account). The mobile application 114 may determine the bound status of the user mobile device 104 via a communicative call (e.g., an API call) to the provider institution computing system 124. The provider institution computing system 124 may then access the authorization database 138, retrieve the bound status associated with the user mobile device 104 (e.g., a Boolean entry in the database), and transmit a reply to the mobile application 114 (via the network 152).

At process 306, the mobile application 114 binds the user mobile device 104 with a financial account associated with the provider institution. The user mobile device 104 is bound to the financial account subsequent to prompting the user 102 for a personal identification number (PIN) associated with the financial account and upon receiving a desire to bind the mobile device to the account from the user. The mobile application 114 may bind the user mobile device 104 via a communicative call (e.g., an API call) to the provider institution computing system 124, which causes the provider institution computing system 124 to access and retrievably store the bound status in the authorization database 138. In some instances, the user mobile device 104 may already be bound to a financial account. The benefit of the binding is that during the authentication process, the provider institution computing system 124 or ATM 140 can confirm that the device identifier associated with the mobile device is linked (bound) to the same account that the transaction is desired to utilize. This can be used in quick ATM transactions, such that the user does not need to designate an account as this is pre-selected/confirmed via the binding of the mobile device to a particular account (e.g., in transactions, such as a quick cash). The user may be able to override this binding to give them an option to select a different account for the transaction, if desired.

At process 308, the mobile application 114 authenticates the user 102, via the security circuit 118. The authentication information may include one or more of the following: a PIN, a biometric scan (e.g., fingerprint analysis, facial feature analysis, voice analysis, etc.), a password, a two-factor notification (e.g., a confirmation link pushed or texted to the user mobile device 104), and a one-time password, etc. The mobile application 114 receives the authentication information to authenticate the user (e.g., based on comparing the received information to stored authentication information).

At process 310, the mobile application 114 receives a designation of transaction type from the user 102. In some embodiments, the process 310 may begin with a request from the ATM (e.g., a transmission from the ATM to the user mobile device 104). The request transmission from the ATM may cause the user mobile device 104 to display a GUI which acts as the user interface of the ATM (e.g., to provide a headless ATM (no display device)). The user 102 may then use the displayed GUI to control the ATM and enter the transaction details (e.g., the designation of transaction type and the transaction configuration option(s) as described in process 314). In some embodiments, the user 102 may enter the transaction details (e.g., provide the designation of transaction type of process 310 and the transaction configuration option(s) of process 314) in a single tap. In other embodiments, the designation of transaction type may be received via a continuous connection (e.g., Bluetooth or Wi-Fi). The designation of transaction type indicates a type of transaction intended for completion at a user-interactive device 140. For example, where the user-interactive device 140 is an ATM, the designation of transaction type may be a cash withdrawal, a deposit, a fund transfer, etc. (e.g., as discussed above with reference to FIG. 2). Additionally, the designation of transaction type may include a designation of a payment vehicle associated with the bound financial account (e.g., the user 102 selects a debit card from a listing of cards presented via the GUI of the mobile application 114). In other examples, the designation of transaction type may be for a transaction occurring at a third-party point-of-sale system.

At process 312, the mobile application 114 transmits a first data payload to the user-interactive device 140 (the ATM). The first data payload is transmitted as part of a second tap of the user mobile device 104 relative to the user-interactive device 140 (the ATM), and includes the designation of transaction type and the authentication information (e.g., as discussed above with reference to FIG. 2). The first data payload may also contain a payment token or may otherwise include tokenized information include in the first data payload.

At process 314, the mobile application 114 receives a prompt from the user-interactive device 140 (the ATM), for a transaction configuration option(s). The prompt is structured to be displayed on a screen of the user mobile device 104. The transaction configuration option(s) may be a variety of configuration options associated with the designation of transaction type. For illustrative purposes, continuing the example of intended use at an ATM, the user 102 may define a designation of transaction type as a withdrawal and subsequently configure the transaction options to include an amount to withdraw, a preferred currency denomination for the withdrawal, and whether or not the user 102 desires a physical receipt of the transaction.

At process 316, the mobile application 114 receives the transaction configuration option(s) from the user 102. The mobile application 114 may receive the transaction configuration option(s) via, for example, a GUI of the mobile application 114, a voice command, a command entered textually, etc.

With reference to FIG. 4, the method 300 continues at process 318 with a transmission of a second data payload to the user-interactive device 140 (the ATM), by the mobile application 114. The second data payload is transmitted as part of a third tap of the user mobile device 104 against the user-interactive device 140 (the ATM), and includes the transaction configuration option(s).

At process 320, the mobile application 114 receives a notification to confirm proceeding with the transaction from the provider institution computing system 124. The notification may be delivered via any variety of correspondence channels established with the user 102. For example, the notification may be generated from within the mobile application 114 (i.e., a push notification), or the notification may be an SMS message, an email, etc. In the first illustrative instance, the notification may be successfully accepted by pressing a button within the mobile application 114. In the illustrative instance where the notification is an SMS message, the notification may be successfully accepted via a response SMS message. In the final illustrative instance (e.g., an email), the notification may be successfully accepted by the user 102 pressing a button within the body of the email. In these embodiments, the notification may be successfully accepted by the user 102 interacting with the notification through the same correspondence channel as the push notification was delivered. In some embodiments, process 320 may be omitted to streamline the transaction.

At process 322, the mobile application 114 transmits a third data payload to the user-interactive device 140 (the ATM), via the user mobile device 104. The third data payload is transmitted as part of a fourth tap of the user mobile device 104 relative to the user-interactive device 140 (the ATM), and contains the confirmation to proceed with the transaction.

At process 324, the transaction is completed. In one embodiment, the user 102 completes the transaction by pressing a button on a GUI generated by the mobile application 114, which indicates the transaction is completed. The transaction is completed according to the designation of transaction type and the transaction configuration option(s). That is, for example, the user 102 successfully receives their withdrawal, in the amount desired and distributed in the currency denomination designated.

Figure 5:
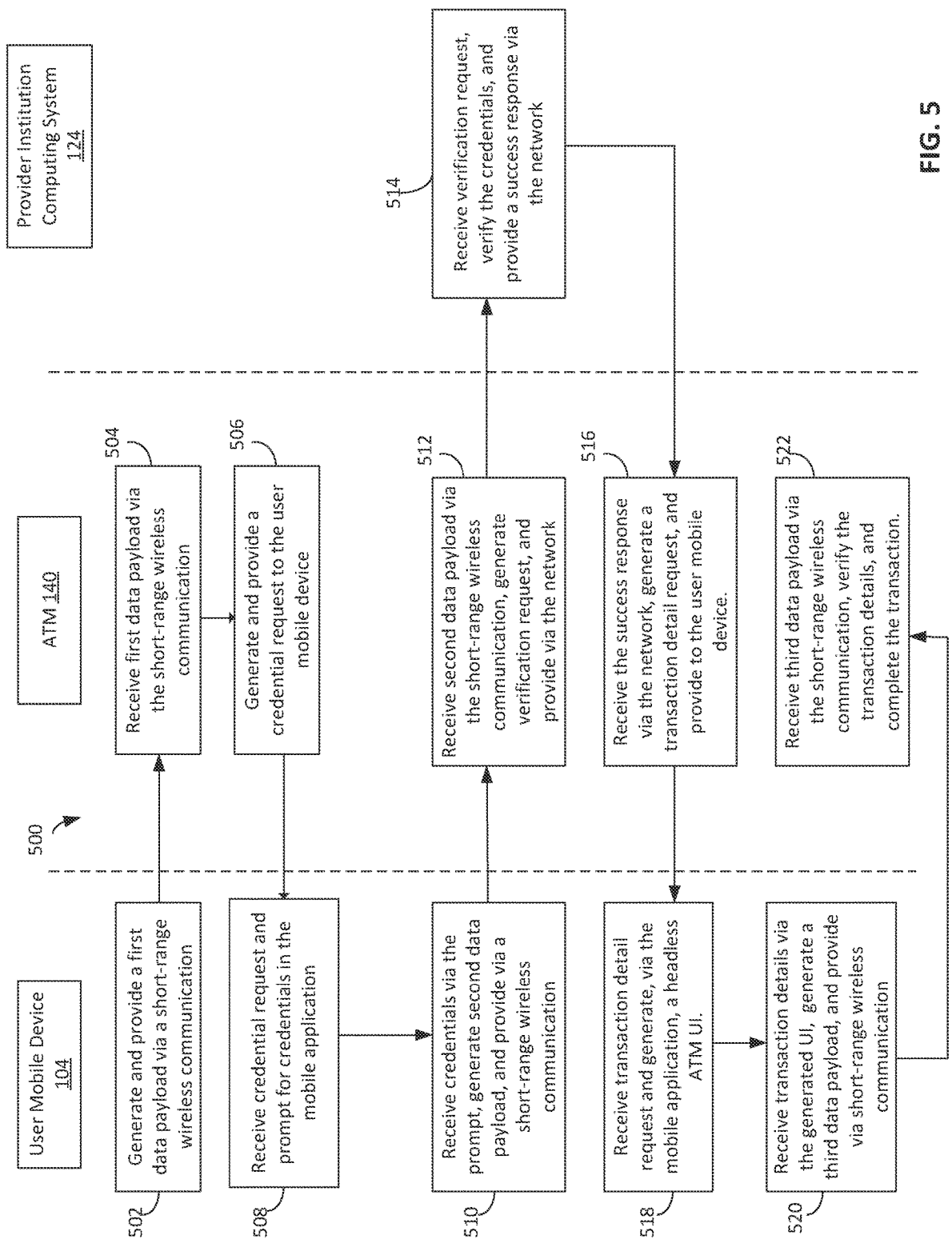
FIG. 5 is a flow diagram of a method for conducting a touchless transaction at an ATM, according to an example embodiment.

Now referring to FIG. 5, a flow diagram for a method 500 for conducting a touchless transaction at an ATM by a user 102, is shown according to an example embodiment. Method 500 may be performed using the system of FIG. 1 such that reference is to the components of FIG. 1 to aid the description of method 500.

At process 502, the user 102 selects a button or icon on the GUI of the mobile application 114 in order to initiate a touchless transaction. The user 102 then taps the user mobile device 104 against or relative to an ATM 140. This tap activates a short-range communication protocol, such as NFC, that causes the mobile application 114 to pair, via the pairing circuit 116, with the ATM 140. Subsequent to a successful pairing, the mobile application 114 may then generate and transfer a first data payload (e.g., according to the communication protocol used in the pairing), including a payment token, to the ATM 140. The payment token is structured to identify an account associated with the user 102. In some embodiments, the payment token is structured to identify a specific payment vehicle associated with the user 102 (e.g., a debit card).

At process 504, the ATM 140 receives the transmitted first data payload, including the payment token. The ATM 140 may receive the first data payload in an encrypted or unencrypted format and according to the communication protocol utilized in the pairing process of 502. In this regard, the first data payload may also include a decryption key that is used by the ATM 140 to decrypt the first data payload to reveal the payment token. The ATM 140 may store information for routing the payment token based on the format (e.g., certain digits may indicate certain financial institutions) to the appropriate provider institution computing systems for de-tokenization. The provider institution 124 may then de-tokenize the payment token to identify the account and/or user. In some embodiments, the ATM 140 may only accept payment tokens from a certain provider institution, such that upon receipt, the ATM 140 automatically routes the payment token to that certain provider institution. Additionally, the ATM 140 may be programmed to recognize valid payment tokens. As a result, the ATM 140 receives the payment token, but cannot identify the user until the authentication information is received. The authentication information serves to then identify the proper user and his/her accounts.

At process 506, the ATM 140 generates and provides a credential request (e.g., authentication information) to the user mobile device 104. The credential request may be provided to the user mobile device 104 according to the communication protocol utilized in the pairing process of 502. The credential request may be for a PIN, a biometric (e.g., fingerprint analysis, facial feature analysis, voice analysis, etc.), a password or pass code, etc.

At process 508, the user mobile device 104 receives the credential request from the ATM 140 (e.g., according to the communication protocol utilized in the pairing process of 502). The received credential request may then cause the mobile application 114 to open or launch on the user mobile device 104 and display a credential prompt. The credential prompt may be displayed via the GUI of the mobile application 114 and contain a form entry area for the user 102 to provide credentials. The form entry area (e.g., fillable field) is structured to receive the authentication information of the user 102 (e.g., via user input, such as a PIN, biometric scan, etc.

At process 510, the user 102 inputs a credential (i.e., authentication information) in a fillable field of the mobile application 114 causing the mobile application 114 to generate a second data payload. The second data payload contains the inputted credential/authentication information and is subsequently transmitted back to the ATM 140 (e.g., according to the communication protocol utilized in the pairing process of 502). The second data payload is transmitted as part of a second tap of the mobile device 104 relative to the ATM 140. The second data payload may be encrypted prior to transmission. One benefit is that the credential (e.g., PIN) is not viewable on the ATM. In some embodiments, the processes of 502 and 510 may be provided in a single tap. For example, the user 102 may first enter credentials and then initiate the transaction with a single tap. In such embodiments, the method 500 may continue from process 512 and skip the intermediary credential request step. Additionally, in various embodiments, the credentials may be verified by at least one of the mobile application 114, the ATM 140, and the provider institution computing system 124. In some embodiments, the method 500 may terminate prematurely if the user 102 fails to tap the user mobile device 104 against the ATM 140 in a predetermined amount of time (e.g., the process 510 may have an expiration timer). In such an embodiment, the user 102 may be required to interact with the ATM 140 in a traditional manner (e.g., via the touchscreen of the ATM) after failing to tap the user mobile device 104 within the predetermined amount of time.

At process 512, the ATM 140 receives the transmitted second data payload, including the credential of the user 102. The ATM 140 may receive the second data payload in an encrypted or unencrypted format and according to the communication protocol utilized in the pairing process of 502. The ATM 140 may then generate a verification request containing the credential of the user 102 and the payment token and transmit it to the provider institution computing system 124 (e.g., over the network 152).

At process 514, the provider institution computing system 124 receives the verification request from the ATM 140. The provider institution computing system 124 may then access the authorization database 138 (e.g., via the device authorization circuit 136) and compare the credential of the user 102 and the payment token received in the verification request with the information stored in the authorization database 138. Upon successful verification of the verification request (e.g., the information stored in the authorization database 138 matches the information received in the verification request), the provider institution computing system 124 may generate and transmit a success response to the ATM 140. The success response may be a special value or a Boolean value (e.g., as implemented by the provider institution 122). Additionally, the success response may further include a unique identifier of the user mobile device 104 in order to verify that the pairing process of 502 occurred between the ATM and the correct mobile device of the user 102.

At process 516, the ATM 140 receives the transmitted success response and generates a transaction detail request. The transaction detail request is structured to request a designation of transaction type and a transaction configuration option(s) as discussed herein. The transaction detail request then transmitted to the user mobile device 104 according to communication protocol utilized in the pairing process of 502. Alternatively, the provider institution computing system 124 may provide the transaction detail request directly to the user mobile device 104 and bypass the ATM 140 (based on, e.g., the device identifier and other user information include in the verification request).

In yet another embodiment, the verification may occur by the ATM 140 in real or near real time (i.e., not transmitted to the computing system 124) (i.e., the ATM 140 verifies the authentication information). In this regard, after de-tokenizing the payment token by the provider institution computing system, the provider computing system 124 may provide an indication of the user/account to the ATM 140. The ATM 140 may have stored information or accessible information regarding this user/account that enables the ATM 140 to verify the authentication information itself.

At process 518, the user mobile device 104 receives the transaction detail request (e.g., via NFC or according to the communication protocol utilized in the pairing process of 502), causing the mobile application 114 to generate and open an ATM user-interface structured to receive inputs from the user 102 (e.g., a designation of transaction type and a transaction configuration option(s)). In some embodiments, the user-interface may be structured to mimic the user-interface of the ATM 140 (e.g., a headless ATM). This UI is termed "headless" due to the functionality of the ATM being provided or substantially provided via the generated GUIs of the mobile application. When the ATM verifies the credentials as described in the embodiment above (process 514), the transaction request is transmitted as part of the same short-range wireless communication of the second data payload.

At process 520, the user 102 inputs the transaction details (e.g., desired transaction information) into the generated ATM user-interface (e.g., the designation of transaction type and the transaction configuration option(s)). The user 102 may input the transaction details via voice, text, or a selection of common transaction details from the generated ATM user-interface (e.g., "Fast cash 60$ from checking") of the mobile application 114. The mobile application 114 may then generate a third data payload containing the transaction details and transmit it to the ATM 140 (e.g., according to the communication protocol utilized in the pairing process of 502 and in response to a third tap of the user mobile device 104 against the ATM 140).

At process 522, the ATM 140 receives the transmitted third data payload and processes and verifies the transaction details. The verification may include a variety of checks based on the received transaction details. For example, the ATM 140 may verify that the user 102 has a sufficient balance to complete a withdrawal as specified by the transaction details (e.g., via a confirmation with the provider institution computing system 124 or via internal memory containing account information associated with the payment token). Additionally, the ATM 140 may verify that it is capable of completing the transaction request as defined by the transaction details (e.g., the user 102 requested a currency denomination that may not be supported by the specific ATM 140). The ATM 140 may then complete the transaction request as defined by the transaction details (e.g., the user 102 requested a $100 withdrawal to be dispersed via $20 denominations).

In the above example, three taps or short-range wireless communications are used between the ATM 140 and the mobile device 104: the first data payload transmission and subsequent credential request (a part of a first short range wireless communication); the second data payload transmission and the request for transaction details (a part of a second short range wireless communication); and the third data payload transmission and a confirmation message (if provided from the ATM)(a part of a third short range wireless communication). These two-way communications break up the touchless/contactless transaction into discrete parts, which imparts security into the transaction.

Figure 6:
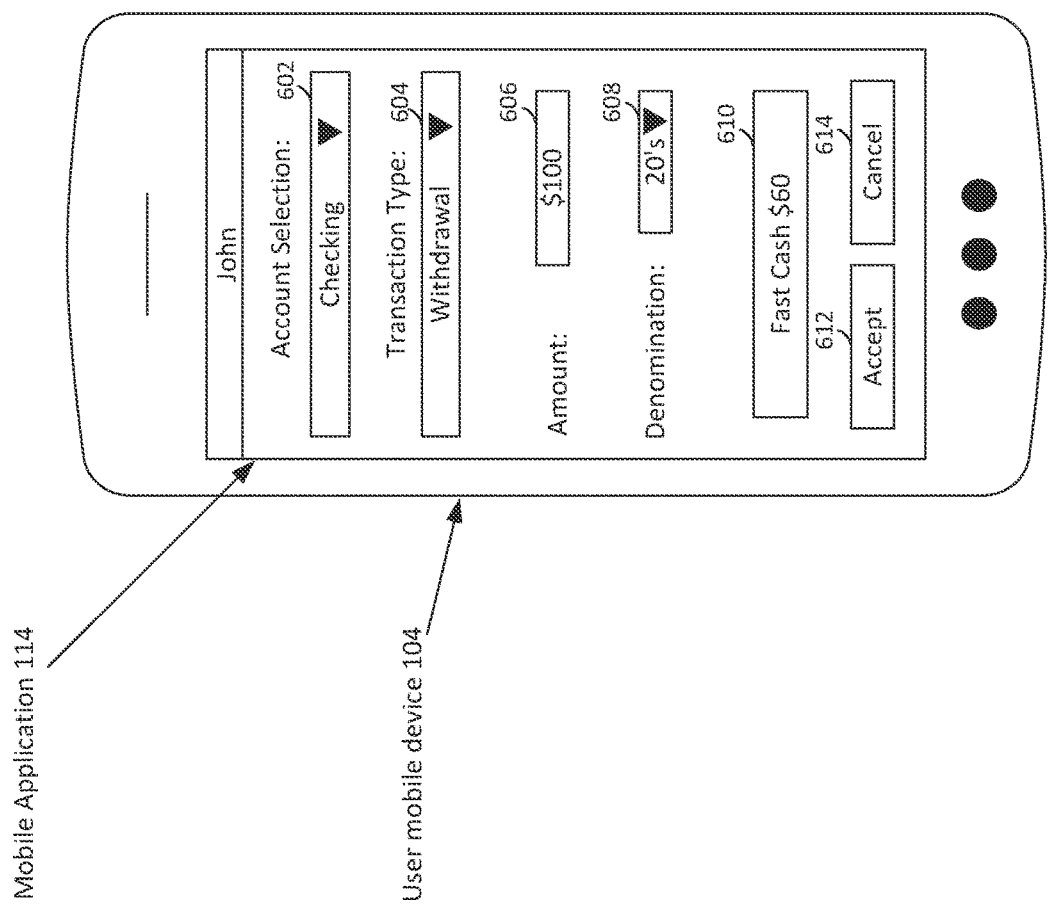
FIG. 6 is a user mobile device graphical user interface displayed during a touchless ATM transaction, according to an example embodiment.

Referring now to FIG. 6, an illustrative example of a user mobile device 104 display during an ATM transaction is shown. This display may be used to pre-stage the transaction or as part of the discrete transaction process. In the depicted embodiment, the user mobile device display is a user-interface generated by the mobile application 114 and designed to functionally replace the user-interface of the ATM 140 (e.g., designed to mimic or sufficiently mimic the user-interface of the ATM in such a manner that all functionalities of the ATM 140 may be accessed via the mobile application 114). In some embodiments, the generated user-interface of the mobile application 114 may be used to access and control headless ATMs (e.g., ATMs without a display screen).

The generated ATM user-interface of the mobile application 114 includes an account selection drop-down style menu 602, a transaction type (e.g., the designation of transaction type) drop-down style menu 604, an amount form entry style box 606 (e.g., to enter a currency value for the transaction), a denomination selection drop-down style menu 608, a "Fast Cash $60" selectable button 610, an accept button 612, and a cancel button 614.

The account selection drop-down style menu 602 may present a list of selectable accounts associated with the user 102 (e.g., checking, savings, etc.). In some embodiments, the account selection drop-down style menu 602 may initially present a default choice to the user 102 (e.g., checking as depicted). In other embodiments, the account selection drop-down style menu 602 may be initially empty and require an account designation from the user 102.

The transaction type drop-down style menu 604 may present a list of selectable transaction types (e.g., withdrawal, deposit, balance inquiry, etc.). In some embodiments, the transaction type drop-down style menu 604 may initially present a default choice to the user 102 (e.g., withdrawal as depicted). In other embodiments, the transaction type drop-down style menu 604 may be initially empty and require a designation of transaction type from the user 102.

The amount form entry style box 606 may provide a numerical form entry for a user 102 to designate an amount for the transaction (e.g., entered textually, via voice, etc.). The amount form entry style box 606 is structured to contain logic which prevents non-numerical entries and further structured to abide by the distribution properties of the prospective ATM (e.g., dollar amounts distributable by the denominations available to the ATM, no cents, etc.).

The denomination selection drop-down style menu 608 may provide a list of selectable currency denominations available at the ATM (e.g., 5's, 10's, 20's, etc.). In some embodiments, the denomination selection drop-down style menu 608 may initially present a default choice to the user 102 (e.g., 20's as depicted). In other embodiments, the denomination selection drop-down style menu 608 may be initially empty and require a denomination designation from the user 102.

The "Fast Cash $60" selectable button 610 may provide a one-touch selection option to the user 102 for common transactions (e.g., depicted as a $60 withdrawal from the primary checking account associated with the user 102). The one-touch selection enables a user 102 to press the "Fast Cash $60" button 610 in order to conduct a withdrawal of $60 from a primary checking account without any additional input from the user 102. In some embodiments, the amount of the common transaction depicted via the "Fast Cash $60" selectable button 610 may be based on provider institution 122 averages (e.g., the average transaction at an ATM is a $60 withdrawal from a primary checking account). In other embodiments, the "Fast Cash $60" selectable button 610 may be depicted according to the most common transaction associated with the specific ATM being accessed (e.g., the button may read "Fast Cash $100" in more affluent areas).

The accept button 612 may provide the user 102 a selectable button to finalize a transaction according to the selected/inputted options of the generated user-interface (e.g., as described above). The accept button 612 may then initiate a transaction with the ATM 140 according to the methods as described with reference to FIGS. 3, 4, and 5.

The cancel button 614 may provide the user 102 a selectable button to cancel or abort a transaction (e.g., before the transaction is transmitted to the ATM 140). In some embodiments, the cancel button 614 may clear the selections and field entries of 602, 604, 606, and 608. In other embodiments, the cancel button 614 may cause the mobile application 114 to revert to a standard display (e.g., instead of the generated user-interface of the ATM 140). In yet other embodiments, the cancel button 614 may cause the mobile application 114 to exit.

The above-described systems and methods describe a mobile application that utilizes taps of a user mobile device against a user-interactive device in order to conduct a touchless transaction. The described systems and methods serve to improve the technological field of at least ATM transaction, as reflected in improvements in security, privacy, and health. Accordingly, by enabling a user to interactive with a user-interactive device through a mobile device, a risk for exposure to contaminates on the surface of the user-interactive device is mitigated.

While this specification contains many specific implementation details and/or arrangement details, these should not be construed as limitations on the scope of any inventions or of what may be claimed, but rather as descriptions of features specific to particular implementations and/or arrangements of the systems and methods described herein. Certain features that are described in this specification in the context of separate implementations and/or arrangements can also be implemented and/or arranged in combination in a single implementation and/or arrangement. Conversely, various features that are described in the context of a single implementation and/or arrangement can also be implemented and arranged in multiple implementations and/or arrangements separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

It should be understood that no claim element herein is to be construed under the provisions of 35 U.S.C. § 112(f), unless the element is expressly recited using the phrase "means for."

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the embodiments might include a general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and embodiment of the embodiments without departing from the scope of the present disclosure as expressed in the appended claims.

What is claimed is:

1. A method for conducting a transaction via a mobile device, the method comprising:

transmitting, by a mobile device having a provider institution mobile application, a first data payload to a user-interactive device via a first short-range wireless communication;

automatically launching the provider institution mobile application on the mobile device based on a request from the user-interactive device received via the first short-range wireless communication;
transmitting, by the provider institution mobile application via the mobile device, authentication information to the user-interactive device via a second short-range wireless communication according to the request;
receiving, by the provider institution mobile application via the mobile device, a second request for transaction information from the user-interactive device via the second short-range wireless communication; and
transmitting, by the provider institution mobile application via the mobile device, transaction information to the user-interactive device via a third short-range wireless communication as part of the transaction.

2. The method of claim 1, wherein receiving the second request for transaction information from the user-interactive device via the second short-range wireless communication includes generating, by the provider institution mobile application, a graphical user interface on the mobile device including at least one fillable field, wherein the at least one fillable field includes an amount field for the transaction and a designated account for the transaction.

3. The method of claim 1, further comprising:
generating, by the provider institution mobile application via the mobile device, a graphical user interface containing an icon for confirming the transaction.

4. The method of claim 1, wherein the first data payload is encrypted, and wherein the method further includes transmitting, by the provider institution mobile application via the mobile device, a decryption key to the user-interactive device as part of the first data payload for decrypting the first data payload.

5. The method of claim 1, wherein the first data payload includes a payment token associated with an account of a user.

6. The method of claim 1, wherein the first, second, and third short-range wireless communications occurs via the same wireless communication protocol.

7. The method of claim 1, further comprising receiving, by the provider institution mobile application via the mobile device, a confirmation of a successful completion of the transaction.

8. The method of claim 1, wherein the authentication information includes at least one of a password, a passcode, or a biometric credential.

9. The method of claim 1, wherein the first, second, and third short-range wireless communications are near-field communication (NFC) wireless transmissions.

10. A method for conducting an ATM transaction via a mobile device, the method comprising:
receiving, by a provider institution mobile application of the mobile device, a request to pre-stage an ATM transaction and an input designating a transaction type;
receiving, by the provider institution mobile application of the mobile device, an input specifying a transaction option for the ATM transaction;
generating, by the provider institution mobile application, an authentication approval value based on a verified authentication credential of a user; and
transmitting, by the provider institution mobile application via the mobile device, a data payload to an ATM via a wireless communication, the data payload comprising the designated transaction type, the transaction option, and the authentication approval value.

11. The method of claim 10, wherein the data payload is encrypted, and wherein the method further comprises transmitting, by the provider institution mobile application via the mobile device, a decryption key to the ATM as part of the data payload for decrypting the data payload.

12. The method of claim 10, wherein the authentication approval value is based on an authentication credential received by the provider institution mobile application, and wherein the authentication credential is verified by the provider institution mobile application.

13. The method of claim 12, wherein the authentication credential includes at least one of a password, a passcode, or a biometric credential.

14. The mobile device of claim 10, wherein the data payload is transmitted via a near-field communication (NFC) wireless transmission protocol.

15. The method of claim 10, wherein the data payload includes a payment token regarding an account of the user, the payment token including a tokenized account number of the account of the user.

16. A mobile device, comprising:
a network circuit structured to exchange data with a provider institution computing system;
an input/output device structured to exchange data with a user;
a processor; and
a memory configured to store program instructions of a mobile application that are executable by the processor to cause operations including:
transmit a first data payload to a user-interactive device via a first short-range wireless communication;
automatically launch the mobile application on the mobile device based on a request from the user-interactive device received via the first short-range wireless communication;
transmit authentication information to the user-interactive device via a second short-range communication according to the request; and
transmit transaction information to the user-interactive device via a third short-range communication as part of a transaction.

17. The mobile device of claim 16, wherein the operations further include:
receive a second request for transaction information from the user-interactive device via the second short-range communication.

18. The mobile device of claim 16, wherein the transaction information comprises a designated transaction type and a transaction configuration option, the operations further comprising:
receive an authorization from the provider institution computing system for executing the transaction according to the designated transaction type and the transaction configuration option.

19. The mobile device of claim 18, wherein the authorization is based on a location of the mobile device being within a predefined geo-fenced area, and wherein the first, second, and third short-range wireless communications occur via the same wireless communication protocol.

20. The mobile device of claim 18,
wherein the mobile device is configured to transmit information to the user-interactive device via the mobile application.

* * * * *